Oct. 27, 1970 A. S. COCHRAN ET AL 3,536,902

SEQUENCE STEP CHECK CIRCUIT

Filed April 15, 1969 3 Sheets-Sheet 1

INVENTORS
ALFRED S. COCHRAN
JOHN R. VANDE WEGE

BY *Bernard E. Franz*

ATTY.

SEQUENCE STEP CHECK CIRCUIT

United States Patent Office 3,536,902
Patented Oct. 27, 1970

3,536,902

SEQUENCE STEP CHECK CIRCUIT

Alfred S. Cochran, Elmhurst, and John R. Vande Wege, Glen Ellyn, Ill., assignors to Automatic Electric Laboratories, Inc., Northlake, Ill., a corporation of Delaware

Filed Apr. 15, 1969, Ser. No. 816,246
Int. Cl. G05b *23/02;* H03k *5/18*
U.S. Cl. 235—153 7 Claims

ABSTRACT OF THE DISCLOSURE

A checking circuit for use with a sequence circuit of a switch marker. The five bistable stages of the marker sequence state register have their inputs controlled by the sequence state advance logic and the outputs connected into the sequence state decoding logic. A buffer register is connected from the outputs of the sequence register to record the state of the sequence state register prior to its advancing to a new state. A comparison circuit is included to indicate which of the bistable stages changed state during the sequence advance. The outputs of the comparators are then grouped into the various useable permutations of the register bistable stages in a series of gates, after which, these gate outputs are regrouped with the decoder outputs to determine for each sequence advance whether it was a legitimate change.

BACKGROUND OF THE INVENTION

Field of the invention

This invention relates in general to checking circuits, and more particularly to apparatus for checking the sequence state circuit of a communications switching marker, where it is frequently possible to advance into any one of a plurality of sequence states.

Description of the prior art

A sequencing circuit is an important element in wired program electronic equipment. It stores the operating state of the equipment during its performance of the operations for that state, and then advances to a subsequent state upon completion of these operations. The subsequent state is not always the immediately succeeding state of a sequence of states but, dependent upon the results of the performance of the operations in the state, it may be required to proceed into one of a plurality of programmed states. In view of this plurality of possible legitimate steps, it is not possible to use a conventional counting type checking circuit.

SUMMARY OF THE INVENTION

In order to check for a proper sequence state advance in a non-linearly advancing sequence, information must be available as to the states from which a new state is entered, or what state may be entered from an existing state.

This information is obtained in the disclosure of this invention from a register set to the state from which the current state was entered.

The elements of this register are then compared with the corresponding elements of the marker sequence state register. The resulting outputs of these comparisons are grouped in a series of gates; with each gate providing an output, indicative of a particular combination of register elements having changed states.

The outputs of these gates are then selectively gated with the decoded sequence state outputs from the marker, to provide an alarm output only in the case of an invalid combination of a current sequence state and an improper register change.

DESCRIPTION OF THE DRAWINGS

The novel features which are believed to be characteristic of the invention, both as to its organization and method of operation, will be more apparent from the following detailed description, taken in conjunction with the drawings comprising FIGS. 1–3 wherein.

Cross references to related applications

Figure 1:
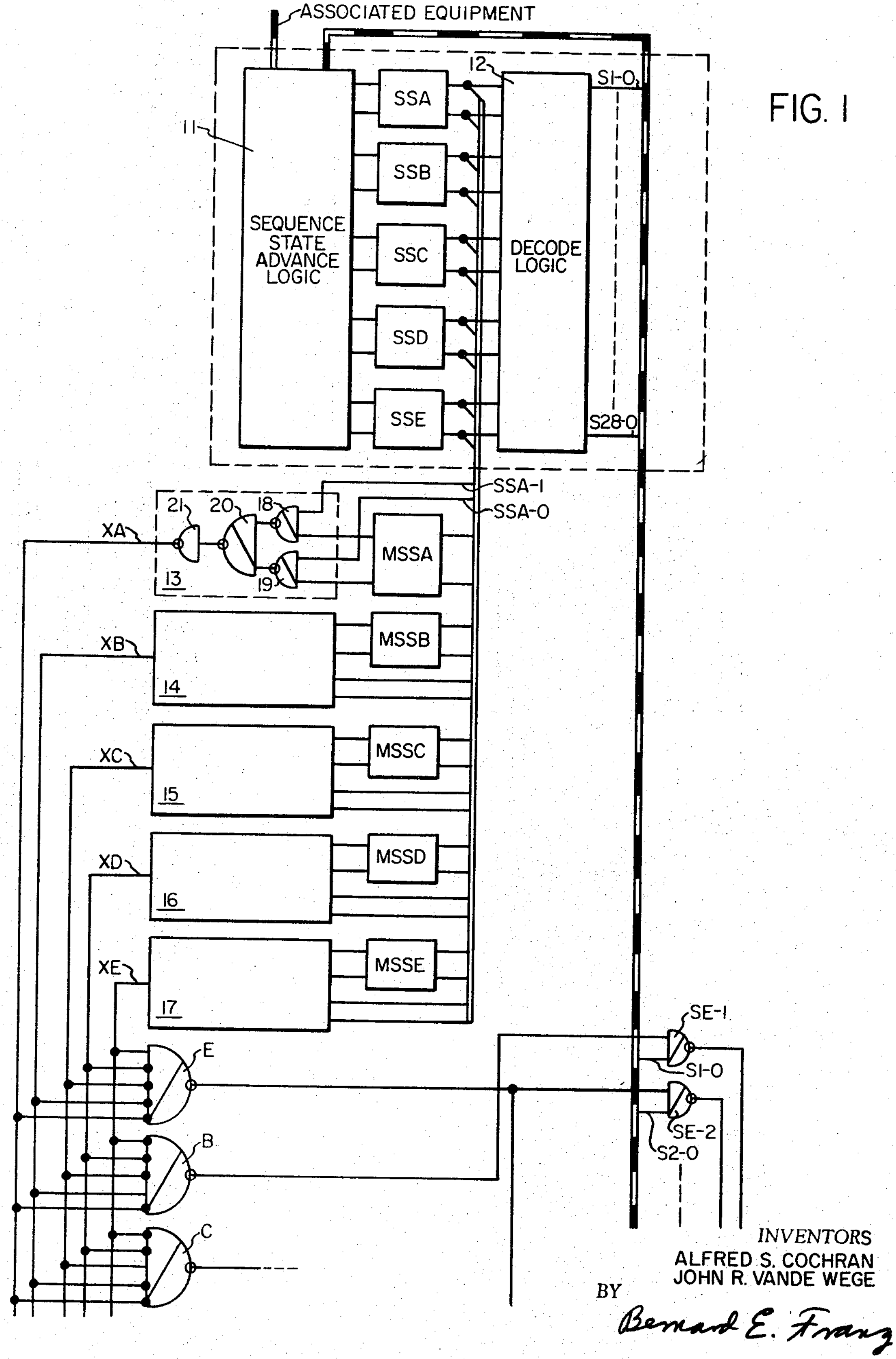
FIGS. 1 and 2 arranged with FIG. 1 above FIG. 2 comprise a schematic of the checking circuit of this invention as connected to the sequence state register of a switching system marker.
Figure 2:
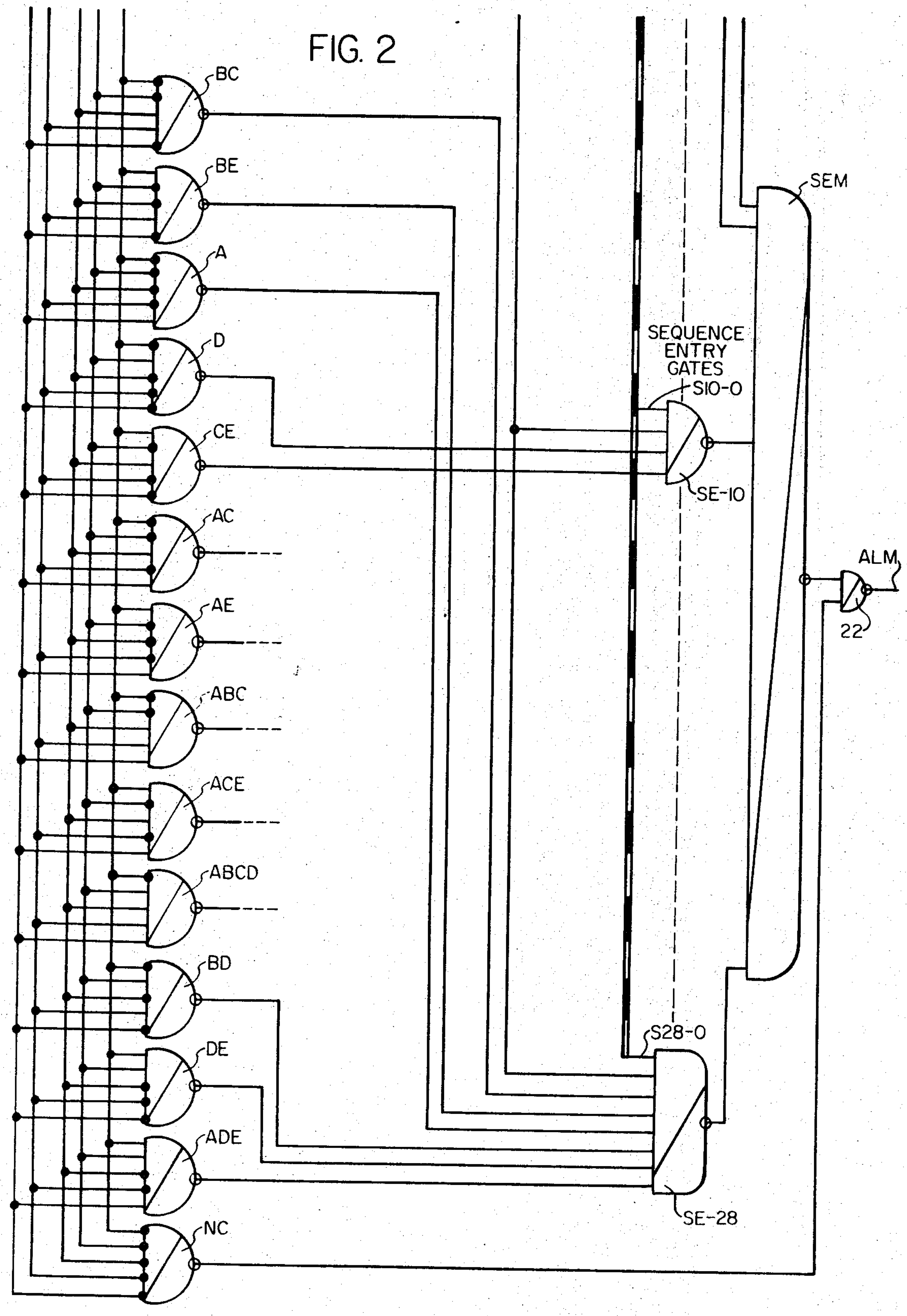

The preferred embodiment disclosed herein is for use in the switching network and marker described in U.S. Pat. No. 3,413,421 filed June 14, 1965 by A. S. Cochran et al. for Identifying Arrangement for Communication Switching System.

The building block circuits may be of the type described in U.S. Pat. No. 3,293,368 by W. R. Wedmore, with reference in particular to FIG. 51 of the drawing and columns 23, 24, 48 and 49 of the specification thereof.

The above mentioned patents are owned by the same assignee as the present application and are incorporated herein and made a part hereof as though fully set forth.

DESCRIPTION OF THE PREFERRED EMBODIMENT

The invention is incorporated in the marker apparatus of the referenced Pat. 3,413,421.

The marker is arranged to perform its functions in a series of steps, these steps are arranged to optimally perform the operations required in completing a connection through the matrix with which the marker is associated. This sequence is fixed, but there are variable that may or may not require certain operations of the marker. These variables are accommodated by including, omitting or altering the sequence of steps or groups of steps in the over-all sequence.

Figure 3:
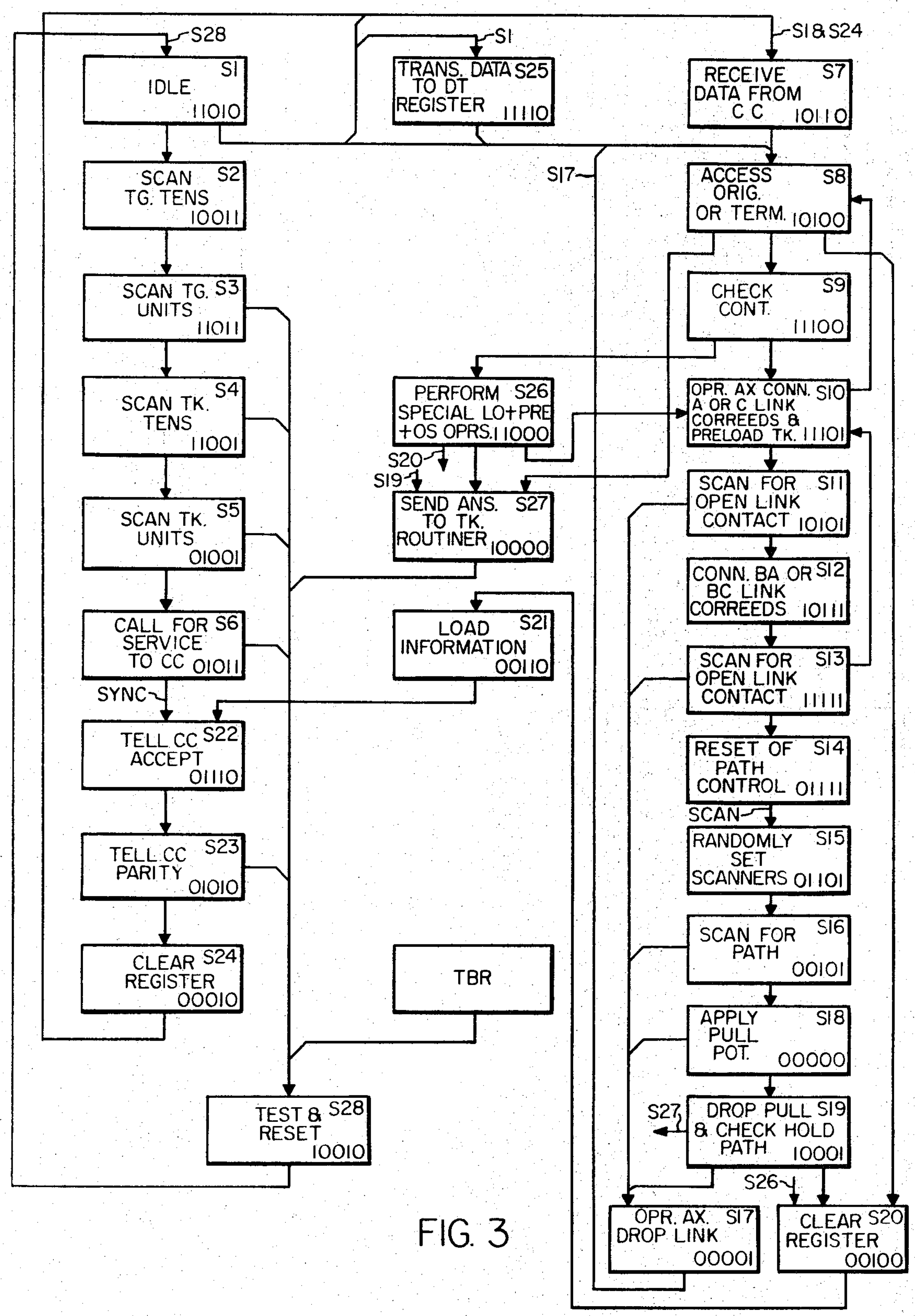
FIG. 3 is a sequence state chart of the operations of a switching system marker.

A simplified sequence state flow chart of the originating marker is shown in FIG. 3. The operations required to be performed by the marker for satisfactorily completing its functions are briefly described, being initiated from sequence state 1. This is the state that the marker remains in while waiting for a call for service. Upon receipt of a call for service the marker will perform certain tests as to where the call originated, that is whether from a high priority line, a normal call for service, a common control call for service or a routiner call for service. Then, dependent upon which of the preceding types the call for service is, the marker will advance to sequence state 2 for a high priority call or a normal call, to sequence state 7 for a common control call for service or to sequence state 25 for a routiner call for service.

In sequence state 25, the marker receives the information for the operation required by the routiner. The marker will next enter sequence state 8 and proceed through the subsequent steps as for a matrix call for service until it reaches sequence state 19, where it will go to sequence state 27 instead of 20.

When the advance is to sequence state 2 the marker identifies the trunk-group tens digit and proceeds to sequence state 3 where the trunk-group units digit is identified.

In states 4 and 5 the marker will identify the trunk tens and units digits respectively, and proceed to sequence state 6. During any of the states 2 through 5 the marker will proceed to sequence state 28, should the call be abandoned. The marker has the identity of the line calling for service stored within itself, upon entering sequence state 6, and proceeds to call for the common control equipment. The marker advances to sequence state 22 if a common control register is available, otherwise it goes to sequence state 28.

During sequence state 22 the identity information is sent to the common control and checked for proper reception, after which the sequence is advanced to state 23.

In sequence state 23 the marker indicates to the common control equipment that the parity of the information sent was correct. Again, if the call should become abandoned at this stage, the marker will proceed to state 28, otherwise it goes to state 24.

In sequence state 24 the marker resets its data registers preparatory to receiving the matrix numbers from the common control. After the data registers have been reset the marker advances to state 7 during which the common control responds with various items of processing information. If the call had originated with the common control equipment, the marker would receive the special function data as well as that normally received.

The program is next advanced to sequence state 8 where the marker operates relays of a tree to the terminating trunk and operates the selected unit. Normally the next sequence state is 9 during which the continuity of the control lead contacts is checked. Upon completion of these tests the marker advances to sequence state 10, however, if the call originated with the common control equipment and was for the purpose of locking out or pre-empting a trunk, the marker would go to sequence state 26. The marker would also go to sequence state 26 when the call is from a routiner.

In sequence state 26, if the instructions are for a lock-out operation, this will be performed and the marker will proceed to sequence state 20 to inform the common control equipment of the successful completion of the operation; if the instructions are for a pre-empt operation, this is attempted, and if successful, the marker proceeds to sequence state 10, if unsuccessful the marker enters sequence states 20 and 21 to inform the common control equipment of this inability. Where the call is from the routiner, as for example to place a trunk out of service, this operation is performed and the marker enters sequence state 27. In sequence state 27 the marker returns information to the routiner relative to the operation performed and proceeds to sequence state 28.

In sequence state 10 various items of information are loaded into the trunk circuit and the tree to the terminating trunk is dropped, after which the marker returns to sequence state 8.

During the second time in sequence state 8 the marker operates relays of a tree to the originating trunk and proceeds through states 9 and 10 in the same manner as described above. This time upon leaving state 10 the marker is advanced to state 11.

In sequence state 11 the path scanner is started and the contact continuity is checked through the A links and then exits to state 12. However, if the contacts are open the exit is to sequence state 17.

In sequence state 12 the BA links are tested and the marker advances to sequence state 13.

In sequence state 13 the marker scans for open BA links and then since the path is not complete the marker is returned to sequence state 10. Upon entering sequence state 10 for the third time the marker tests the leads to the C side of the matrix preparatory to scanning them and proceeds to state 11. During this, its second time in sequence state 11, the marker scans for open leads, and if the leads test correctly the marker proceeds to sequence state 12.

In sequence state 12 the second time the marker connects the BC–BB links to the scanner, then enters sequence state 13.

During the second time in sequence state 13 the links are scanned for an open circuit condition after which sequence state 14 is entered.

In sequence state 14 the path control equipment is reset and the marker is advanced.

In sequence state 15 the path scanner is set to a random starting position.

And in sequence state 16 the scanner is operated to select a path. If a path is found the marker proceeds to sequence state 18, if not then to sequence state 17.

In sequence state 17 the marker reverses the A and C appearances of the originating and terminating trunks and then proceeds through sequence states 8, 9, 10, 11, 12, 13, 14, 15 and 16. After passing through sequence state 16 the marker advances to sequence state 18.

In sequence state 18 the marker applies the pull potentials to operate the crosspoints of its selected path and proceeds to sequence state 19.

In sequence state 19 the selected path is checked for continuity and if successfully completed proceeds to sequence state 20.

In sequence state 20 the data transfer registers of the marker are reset and the marker proceeds to state 21.

In sequence state 21, information about the call is prepared for sending to the common control equipment and the marker enters state 22.

In sequence state 22 the information is transferred to the common control, and the marker enters state 23.

During state 23 the marker performs the parity test on the data, and if correct enters state 28.

In sequence state 28 the marker performs a series of tests to insure a successful resetting of the marker, after which the marker returns to sequence state 1.

Each of the sequence states of the marker is recorded, during its existance, by the sequence state register consisting of the five bistable devices SSA through SSE. This register is operated to advance its count by the wired logic shown by block 11 which is connected to the associated elements of the marker, and to the register decode logic shown by block 12.

A second sequence state register consisting of bistable devices MSSA through MSSE is provided to record the sequence state of the marker prior to the marker sequence state register advancing into a new state. The timing and drive circuitry to perform this registration is not shown, since it is merely an engineering expedient to gate the timing pulses at the appropriate time to effect the registration into this second sequence state register.

A comparison circuit 13 consisting of gates 18, 19, 20 and 21 is shown, with one input of nor gate 18 connected to the "1" output of bistable device MSSA and the other input connected to the "1" output of bistable device SSA. Gate 19 is similarly connected to the "0" outputs of each of the register bistable devices SSA and MSSA. The outputs of gates 18 and 19 are connected to the input of nor gate 20. Thus, if both bistables are in the same set or reset state, the output of nor gate 20 will be a "0." This will be inverted by gate 21 to produce a "1" output on lead XA whenever there is agreement.

When, after a sequence state advance, bistable device SSA changed state, the inputs to each of the nor gates 18 and 19 will be a "1" and a "0" to produce two "0" inputs to nor gate 20. Nor gate 20 will respond with a "1" output. This "1" is inverted by gate 21 to produce a "0" output on lead XA. Comparison circuits 14, 15, 16 and 17 operate similarly for the corresponding bistable devices.

Thus, the five leads XA through XE corresponding to the five bistable devices SSA through SSE will have a "1" output signal whenever there was no change of state for the corresponding device during a sequence advance, and a "0" output signal every time there was a change of state.

this should be detected by gate E where leads XA through XD are inverted at the input and input XE is not. Therefore, the inputs to E are all effectively a signal "0," causing it to produce a "1" output. This output along with the decoded sequence state 2 signal "0" output is connected to the input of sequence entry gate SE2. At SE2 the combination of a "1" and a "0" input results in a "0" output. The other sequence entry gates all have a signal "1" input from the sequence decode logic and a signal "0" from the

TABLE A

| Preceding | MSS BISTABLE STATES A | B | C | D | E | Current | SS BISTABLE STATES A | B | C | D | E | Bistable changed |
|---|---|---|---|---|---|---|---|---|---|---|---|---|
| 28 | 1 | 0 | 0 | 1 | 0 | 1 | 1 | 1 | 0 | 1 | 0 | B |
| 1 | 1 | 1 | 0 | 1 | 0 | 2 | 1 | 0 | 0 | 1 | 1 | BE |
| 2 | 1 | 0 | 0 | 1 | 1 | 3 | 1 | 1 | 0 | 1 | 1 | B |
| 3 | 1 | 1 | 0 | 1 | 1 | 4 | 1 | 1 | 0 | 0 | 1 | D |
| 4 | 1 | 1 | 0 | 0 | 1 | 5 | 0 | 1 | 1 | 0 | 1 | A |
| 5 | 0 | 1 | 0 | 0 | 1 | 6 | 0 | 1 | 0 | 1 | 1 | D |
| 1 | 1 | 0 | 0 | 1 | 0 | 7 | 1 | 0 | 1 | 1 | 0 | C |
| 24 | 0 | 0 | 0 | 1 | 0 | 7 | 1 | 0 | 1 | 1 | 0 | AC |
| 1 | 1 | 0 | 0 | 1 | 0 | 8 | 1 | 0 | 1 | 0 | 0 | CD |
| 7 | 1 | 0 | 1 | 1 | 0 | 8 | 1 | 0 | 1 | 0 | 0 | D |
| 10 | 1 | 1 | 1 | 0 | 1 | 8 | 1 | 0 | 1 | 0 | 0 | BE |
| 17 | 0 | 0 | 0 | 0 | 1 | 8 | 1 | 0 | 1 | 0 | 0 | ACE |
| 25 | 1 | 1 | 1 | 1 | 0 | 8 | 1 | 0 | 1 | 0 | 0 | BD |
| 8 | 1 | 0 | 1 | 0 | 0 | 9 | 1 | 1 | 1 | 0 | 0 | B |
| 9 | 1 | 1 | 1 | 0 | 0 | 10 | 1 | 1 | 1 | 0 | 1 | E |
| 13 | 1 | 1 | 1 | 1 | 1 | 10 | 1 | 1 | 1 | 0 | 1 | D |
| 26 | 1 | 1 | 0 | 0 | 0 | 10 | 1 | 1 | 1 | 0 | 1 | CE |
| 10 | 1 | 1 | 1 | 0 | 1 | 11 | 1 | 0 | 1 | 0 | 1 | B |
| 11 | 1 | 0 | 1 | 0 | 1 | 12 | 1 | 0 | 1 | 1 | 1 | D |
| 12 | 1 | 0 | 1 | 1 | 1 | 13 | 1 | 1 | 1 | 1 | 1 | B |
| 13 | 1 | 1 | 1 | 1 | 1 | 14 | 0 | 1 | 1 | 1 | 1 | A |
| 14 | 0 | 1 | 1 | 1 | 1 | 15 | 0 | 1 | 1 | 0 | 1 | D |
| 15 | 0 | 1 | 1 | 0 | 1 | 16 | 0 | 0 | 1 | 0 | 1 | B |
| 11 | 1 | 0 | 1 | 0 | 1 | 17 | 0 | 0 | 0 | 0 | 1 | AC |
| 13 | 1 | 1 | 1 | 1 | 1 | 17 | 0 | 0 | 0 | 0 | 1 | ABCD |
| 16 | 0 | 0 | 1 | 0 | 1 | 17 | 0 | 0 | 0 | 0 | 1 | C |
| 18 | 0 | 0 | 0 | 0 | 0 | 17 | 0 | 0 | 0 | 0 | 1 | E |
| 19 | 1 | 0 | 0 | 0 | 1 | 17 | 0 | 0 | 0 | 0 | 1 | A |
| 16 | 0 | 0 | 1 | 0 | 1 | 18 | 0 | 0 | 0 | 0 | 0 | CE |
| 18 | 0 | 0 | 0 | 0 | 0 | 19 | 1 | 0 | 0 | 0 | 1 | AE |
| 8 | 1 | 0 | 1 | 0 | 0 | 20 | 0 | 0 | 1 | 0 | 0 | A |
| 19 | 1 | 0 | 0 | 0 | 1 | 20 | 0 | 0 | 1 | 0 | 0 | ACE |
| 26 | 1 | 1 | 0 | 0 | 0 | 20 | 0 | 0 | 1 | 0 | 0 | ABC |
| 20 | 0 | 0 | 1 | 0 | 0 | 21 | 0 | 0 | 1 | 1 | 0 | D |
| 6 | 0 | 1 | 0 | 1 | 1 | 22 | 0 | 1 | 1 | 1 | 0 | CE |
| 21 | 0 | 0 | 1 | 1 | 0 | 22 | 0 | 1 | 1 | 1 | 0 | B |
| 22 | 0 | 1 | 1 | 1 | 0 | 23 | 0 | 1 | 0 | 1 | 0 | C |
| 23 | 0 | 1 | 0 | 1 | 0 | 24 | 0 | 0 | 0 | 1 | 0 | B |
| 1 | 1 | 0 | 0 | 1 | 0 | 25 | 1 | 1 | 1 | 1 | 0 | BC |
| 9 | 1 | 1 | 1 | 0 | 0 | 26 | 1 | 1 | 0 | 0 | 0 | C |
| 8 | 1 | 0 | 1 | 0 | 0 | 27 | 1 | 0 | 0 | 0 | 0 | C |
| 19 | 1 | 0 | 0 | 0 | 1 | 27 | 1 | 0 | 0 | 0 | 0 | E |
| 26 | 1 | 1 | 0 | 0 | 0 | 27 | 1 | 0 | 0 | 0 | 0 | B |
| 3 | 1 | 1 | 0 | 1 | 1 | 28 | 1 | 1 | 0 | 1 | 0 | E |
| 4 | 1 | 1 | 0 | 0 | 1 | 28 | 1 | 1 | 0 | 1 | 0 | DE |
| 5 | 0 | 1 | 0 | 0 | 1 | 28 | 1 | 1 | 0 | 1 | 0 | ADE |
| 6 | 0 | 1 | 0 | 1 | 1 | 28 | 1 | 1 | 0 | 1 | 0 | AE |
| 23 | 0 | 1 | 0 | 1 | 0 | 28 | 1 | 1 | 0 | 1 | 0 | A |
| 27 | 1 | 0 | 0 | 0 | 0 | 28 | 1 | 1 | 0 | 1 | 0 | BD |

Table A summarizes the states of the bistable devices for each of the 28 sequence states of this particular application. From this table it can also be seen that in the sequence state register, at least one and as many as four bistable devices may change state in advancing to a succeeding state. The total number of valid combinational changes that can occur, amount to sixteen for the twenty-eight sequence steps. They are: A, B, C, D, E, AC AE, BC, BD, BE, CE, DE, ABC, ACE, ADE and ABCD.

On the drawing there is illustrated a series of seventeen five-input nor gates, one corresponding to each of the sixteen valid combinational changes and labeled accordingly and a gate corresponding to a no change condition labeled NC. Each of these five-input gates has connected to its input, the five leads XA through XE.

These leads are connected directly or inverted as required to produce a "1" output only in the instance of a change of the particular bistable device or devices corresponding to their designation. For example in sequence state 1, bistable devices SSA and SSD would be set, and bistable devices SSB, SSC and SSE would be reset. Prior to advancing to sequence state 2 these conditions would be registered in bistable devices MSSA through MSSE. In advancing from sequence state 1 to sequence state 2 only SSE would change state from the reset to the set position. This would produce a "1" signal on leads XA through XD, and a "0" signal on lead XE. Since SSE has changed state, sequence change gates to produce a "0" input to the sequence entry monitor gate. The sequence entry monitor gate will produce a "1" output to nor gate 22. The sequence change gate NC has a "0" output since there was a sequence change. This "0" output is also connected to gate 22. Gate 22 is connected to operate an alarm circuit when its output is a "1," however, unless there was an erroneous operation it should, as in this instance, always produce a "0" output.

From the foregoing, it will be apparent that applicant's arrangement: of comparing the outputs of a register of the present state with the outputs of a register of the preceding state to determine the elements of the register of the present state that have changed; then using this information, by coding the permutations that are used; and checking that particular coded permutations are the proper ones for each decoded sequence state, thus ensuring that this permutation is a permissible one for the particular present sequence state; is a novel and extremely flexible manner of checking the progression of any non-linear combination of process states. Various changes and alternative implementations will now occur to those skilled in the art without departing from the true spirit and scope of the invention.

What is claimed is:

1. Apparatus to check for failure of a sequencing circuit to correctly advance a sequence state register, having a plurality of register elements, to a legitimate state of a number of predetermined states comprising: a sequence state register decoding means operated to produce a signal on a single lead out of N output leads for each permutation of said register elements, storage means operative to store the state of the sequence register prior to each advance, comparison means associated with said storage means for comparing the stored states of the storage means elements and said sequence state register elements to produce a non-comparison signal upon detection of a change between corresponding elements of said registers, a plurality of coding emans connected to said comparison means outputs to produce a coded output of the changes detected by said comparion means, and a plurality of sequence entry means, each individually corresponding to a particular sequence state as indicated by said register decoding means, each having connected thereto the coded output of each of said coding means representative of a valid change for a particular sequence state, and each operated to produce a signal output upon lack of agreement between said decoded sequence state and said coded comparison change.

2. Apparatus according to claim 1 wherein said coding means comprises a plurality of gates each arranged to produce an output in response to a different particular combination of comparison signals.

3. Apparatus according to claim 1 further including a monitor means to which are connected all of the sequence entry means outputs and operated to produce a first alarm signal output in response to a signal output from any of said sequence entry means.

4. Apparatus according to claim 1 wherein said sequence state register and said storage means each include M bistable register elements and said sequence state register decoding emans is arranged to decode only some of the 2M possible permutations.

5. Apparatus according to claim 4 further including another coding means arranged to produce an output signal in response to the absence of a change signal from any of said comparison means.

6. Apparatus according to claim 5 further including a means combining the first alarm signal output of said monitor means and said other coding means output signal to produce a single alarm signal.

7. A check circuit for use with a sequence state register that is advanced and operated to record the operating state of a sequence of states of an external apparatus and that has a plurality of bistable devices arranged to be operated according to a predetermined pattern to provide a corresponding code at their outputs, said check circuit comprising a buffer register circuit having a plurality of bistable devices corresponding to that of said sequence state register, register interconnect means operative to set said buffer register into agreement with said sequence state register prior to said sequence state register changing to a subsequent state, a comparison means connected to the outputs of each of the corresponding bistable devices of said buffer register and said sequence state register and operated to produce a non-comparison signal on an output lead upon detecting a non-comparison between the devices, a first plurality of gating means each having all of said comparison means outputs connected thereto in a unique permutation thereof, wherein each of said gating means produces an output only in response to one combination of said comparison means permutations, a sequence state register output decoding means, a plurality of sequence state permissible progression check means each having connected at its input the decoded output of a particular sequence state and one of said plurality of said gating means outputs representative of a legitimate progress operated to produce an output only upon an improper combination of said input signals, and a coincidence gate connected at its input to all of said progression gates and operated only upon receipt of an output from one of said progression check means.

References Cited

UNITED STATES PATENTS

| | | | |
|---|---|---|---|
| 3,192,362 | 6/1965 | Cheney | 235—153 |
| 3,249,920 | 5/1966 | Pulver | 340—172.5 |

MALCOM A. MORRISON, Primary Examiner

R. S. DILDINE, Jr., Assistant Examiner

U.S. Cl. X.R.

179—18; 340—172.5